United States Patent [19]

Tamura

[11] 4,333,717
[45] Jun. 8, 1982

[54] CAMERA HAVING FOCUS DETECTION DEVICE

[75] Inventor: Shuichi Tamura, Yokohama, Japan

[73] Assignee: Canon Kabushiki Kaisha, Tokyo, Japan

[21] Appl. No.: 221,701

[22] Filed: Dec. 31, 1980

Related U.S. Application Data

[63] Continuation of Ser. No. 922,647, Jul. 7, 1978, Pat. No. 4,247,187.

[30] Foreign Application Priority Data

Jul. 14, 1977 [JP] Japan .................................. 52-84410
Aug. 5, 1977 [JP] Japan .................................. 52-93998

[51] Int. Cl.³ .............................................. G03B 3/10
[52] U.S. Cl. .................................... 354/25; 354/60 R
[58] Field of Search ............... 354/25, 60 R, 195, 196, 354/198, 31; 355/56; 352/140

[56] References Cited

U.S. PATENT DOCUMENTS

| | | | |
|---|---|---|---|
| 3,618,499 | 11/1971 | Harvey | 354/196 X |
| 3,836,919 | 9/1974 | Matsumoto et al. | 356/5 X |
| 3,936,187 | 2/1976 | Momose | 356/4 |
| 4,126,874 | 11/1978 | Suzuki et al. | 354/60 R |
| 4,154,517 | 5/1979 | Tamura et al. | 354/25 |
| 4,156,563 | 5/1979 | Kato et al. | 354/25 |
| 4,247,187 | 1/1981 | Tamura | 354/25 |

Primary Examiner—Michael L. Gellner
Attorney, Agent, or Firm—Toren, McGeady & Stanger

[57] ABSTRACT

A camera having a focus detecting device for automatically detecting a condition of sharpest focus. According to an improvement of the invention, when the brightness level of an object of principal photographic interest becomes so low as not to permit satisfactory operation of the focus detecting device, or when the actual voltage of a battery falls below a satisfactory operating level for the device, a supplementary device can be rendered operative to control setting of a photo-taking lens independently of the focus detecting device, thereby the camera can be focused at an appropriate distance depending upon the size of diaphragm aperture, namely, in a pan-focus position.

According to a further improvement of the invention, an exposure control apparatus in the camera is made associated with the aforesaid two devices in a manner to be rendered operative in response to an accomplishment of setting the taking lens.

6 Claims, 14 Drawing Figures

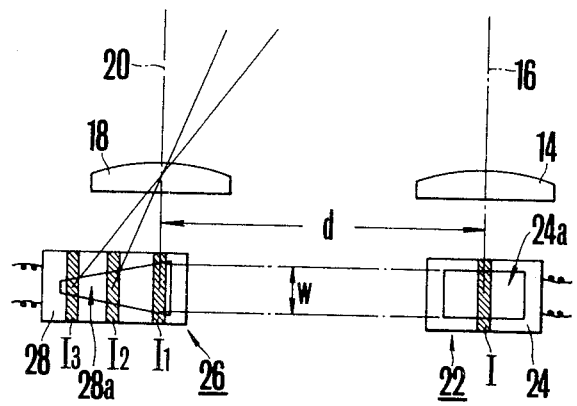
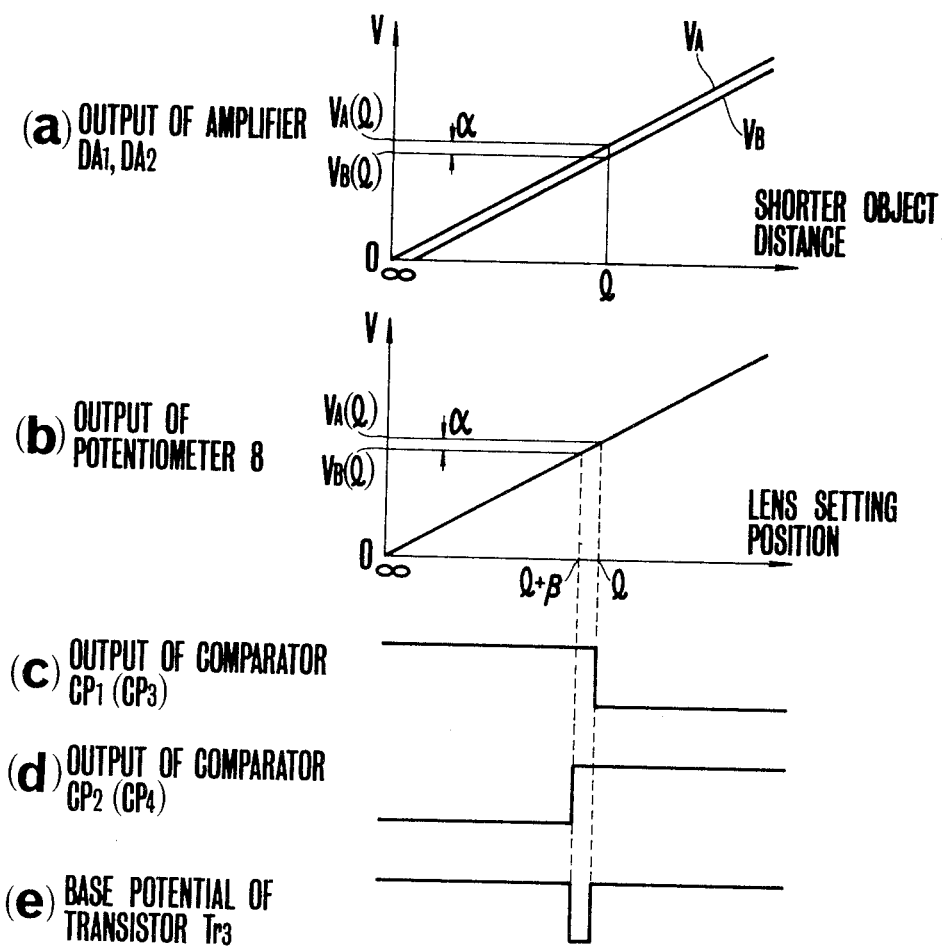

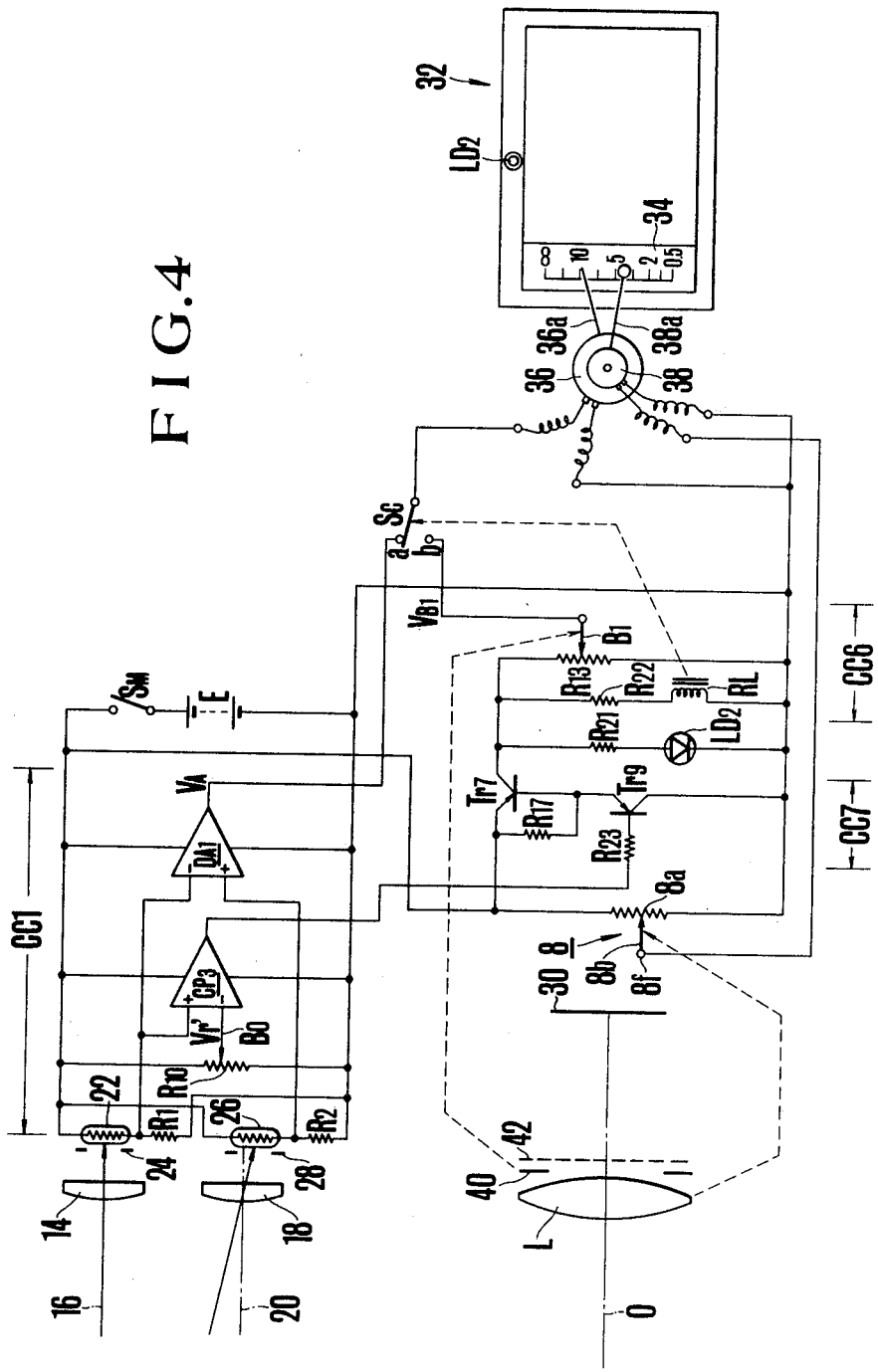
F I G. 4

CAMERA HAVING FOCUS DETECTION DEVICE

This is a continuation of application, Ser. No. 922,647, filed July 7, 1978, now U.S. Pat. No. 4,247,187.

BACKGROUND OF THE INVENTION

1. Field of the Invention

This invention relates to photographic cameras and more particularly to cameras provided with automatic sharp focus detecting devices for electrically detecting a sharpest focus position of a photo-taking lens relative to an object to be photographed or with automatic focus adjusting devices for automatically adjusting a photo-taking lens to a sharpest focus position.

2. Description of the Prior Art

Many devices have been proposed for automatically detecting a sharpest focus position of a photo-taking lens relative to an object to be photographed and for automatically adjusting a photo-taking lens to a sharpest focus position. And, many efforts have been devoted to practical application of these devices to cameras of reduced size.

To regret, however, the conventional types of automatic sharp focus detecting devices or automatic focus adjusting devices can not function perfectly in all the conditions, and are unavoidable to be limited in performance so that it is impossible to perform proper detection of a condition of sharpest focus in some given photographic situations. For example, as these devices may be classified into two main groups, namely, what is called "passive" type where ambient illumination on an object to be photographed is utilized, and what is called "active" type where a radiation (visible light, infrared light and the like) is projected artificially onto the object, and the reflected radiation is utilized, the former type device becomes, because of the utilization of the radiation emanating from the object itself only, impossible to perform sharp focus detection properly when the object brightness level is lowered below the radiation detectable level of the radiation sensor. On the other hand, in the latter type device, because of the independence of the radiation from the object itself, the disadvantage of the former type can be overcome, but instead, when the object has rough surfaces, or when the object is located at a comparatively far range, the intensity of radiation reflected is extremely lowered so that the detection of sharpest focus can not be performed properly. In addition thereto, this active type device necessitates a radiation source such as a light projector which is generally of large consumption of electrical energy. On the other hand, the electrical power source capacity in the camera of reduced size is limited, and therefore, the amount of electrical energy supplied for production of the radiation is limited. This leads also to the limitation of the possible maximum level of radiation energy to be projected. As a result, the range of object distances for which the sharp focus detection is possible becomes narrower and thereby increases in the opportunity of making the focus detection with insufficient accuracy.

Another problem arising in practical application of the automatic sharp focus detecting devices or the automatic focus adjusting devices into the cameras of reduced size, is that, the capacity of the electrical energy source in the camera is limited as mentioned above, while these devices, in general, consume comparatively large electrical energy, regardless of whether the device is of the passive or active type, and can not operate properly when the supplied voltage drops below a satisfactory operating level for the device. It is of importance, therefore, to take into account this fact in practical application of these devices into the cameras of reduced size.

Many attempts have been made to improve the above mentioned drawbacks, but failed to provide decisive solutions therefor.

It is to be understood from the foregoing that, in practical application of these automatic focus detecting or focus adjusting devices into the cameras, it is more advantageous to provide a supplementary device in a relieving sense for the purpose of making it possible to obtain a condition of approximate focusing, although not the perfectly sharpest focus, so that the photographer is enabled to take photographs under the permissible focusing condition when the detection of a condition of sharpest focus can not be performed in a satisfactory manner due to the above mentioned reasons.

In addition to this, from the standpoint of the particular characteristics of photographic cameras, it is further advantageous to make an exposure control apparatus cooperative with the focusing system in such a manner that, when the focus detection can not be performed satisfactorily, the exposure control apparatus is rendered inoperative, and only when the photo-taking lens is properly focused on the object by the use of the automatic sharp focus detecting device or the automatic focus adjusting device, or when the taking lens is adjusted to the approximated focus position by the use of the supplementary device, said exposure control apparatus is rendered operative automatically, thereby the otherwise wasteful consumption of film due to the making of exposures with an unacceptable lack of sharpness of images can be prevented.

SUMMARY OF THE INVENTION

With the foregoing in mind, the present invention intends to provide a camera having an automatic sharp focus detecting device or an automatic focus adjusting device with a relief means rendering it possible to approximately focus the camera when said device is subjected to such a condition that the satisfactory operation for detection of sharpest focus is not assured. In other words, more concretely speaking, a principal object of the present invention is as a camera having a device receptive of radiation from an object to be photographed for finally detecting a condition of sharpest focus, to render it possible to adjust the photo-taking lens to an approximate focus position independently of said device, thereby photographs can be taken under the permissible focusing condition.

To achieve this object, according to the present invention, when the object brightness level is detected to be below that at which the aforementioned automatic sharp focus detecting device or automatic focus adjusting device operates satisfactorily, a supplementary device can be rendered operative either manually or automatically to make it possible to adjust the taking lens to the approximate focus position instead of the aforementioned automatic device.

In a preferred embodiment of the present invention, this supplementary device is so constructed as to make it possible to adjust the lens to a pan-focus position where an image of the object can be formed with an acceptable sharpness on the film plane, in other words, more strictly speaking, in such a manner to take into account the hyper focal range of the used lens. In this case, as is employed in the embodiments of the invention to be described later, it is more advantageous to change the lens adjusting position in accordance with the size of diaphragm aperture.

Another object of the present invention is in addition to the aforesaid main object, to make it possible to adjust the photo-taking lens to the approximate focus position independently of said automatic sharp focus detecting device even when the voltage of an electrical power source of the camera is lowered below a satisfactory operating level for detecting device, thereby photographs can be taken under the permissible focussing condition.

To achieve this object, according to the present invention, in addition to the above mentioned characteristic features, a more advantageous construction is proposed in which the above mentioned supplementary device can be rendered operative either manually or automatically when the voltage of the electrical power source in the camera falls below the predetermined level.

In this case, it is comparatively important to minimize the consumption of electrical energy by the supplementary device.

A further object of the present invention is to simplify the manual changeover operation from the aforesaid automatic sharp focus detecting device to the supplementary device so as not to require complicated manipulation at the time of photographing.

To achieve this object, according to a preferred embodiment of the present invention, the supplementary device is so arranged as to be rendered operative in response to a rearward movement of the photo-taking lens beyond the infinitely focused position.

A further more object of the present invention is to insure that the changeover operation from the aforesaid automatic sharp focus detecting device to the supplementary device is automatically effected with high reliability by use of a very simple circuit construction.

A further more object of the present invention is to more effectively prevent the wasteful consumption of electrical energy of a battery in the camera when the camera is equipped with the automatic sharp focus detecting device together with the supplementary device.

To achieve this object, according to a preferred embodiment of the present invention, a more advantageous arrangement is proposed in which the power supply to the supplementary device is automatically performed at the only time when it is proven that the satisfactory detection of the sharpest focus is not assured by the aforesaid automatic sharp focus detecting device. In addition thereto, according to another embodiment of the invention, a more advantageous arrangement for automatically cutting off the power supply to the aforesaid automatic sharp focus detecting device, particularly when the voltage of the battery is lowered below a predetermined level, is proposed.

A furthermore object of the present invention is to clearly indicate a fact that the adjustment of the photo-taking lens to the sharpest focus position is achieved by the use of the aforesaid automatic sharp focus detecting device, a fact that the satisfactory detection of a condition of sharpest focus by the automatic sharp focus detecting device is not assured and therefore the aforesaid supplementary device is rendered effective instead of the automatic focus detecting device, and a fact that the adjustment of the photo-taking lens to the approximate focus position is accomplished by the use of the supplementary device.

A furthermore object of the present invention is with particular concern to the automatic focusing adjustment of a photo-taking lens to achieve overall automatization of the adjustment of the photo-taking lens by the automatic selection either one of the automatic focus detecting device and the supplementary device.

A furthermore object of the present invention is to enable a camera having an automatic sharp focus detecting device or an automatic focus adjusting device to be effectively prevented from wasteful consumption of films due to the photographing under the improper focus setting of the photo-taking lens.

In particular concern with this object, according to the present invention, a more advantageous arrangement and construction of the camera is proposed in which an exposure control apparatus is rendered inoperative when the satisfactory detection of the sharpest focus by the aforesaid automatic sharp focus detecting device is not fully assured, and then is automatically rendered operative only when the focus adjustment of the photo-taking lens to the proper sharp focus position by the use of the aforesaid automatic sharp focus detecting device, or to the approximate focus position by the use of the aforesaid supplementary device, has been accomplished.

These and other objects and features of the present invention will become apparent from the following detailed description taken in conjunction with the accompanying drawings.

BRIEF DESCRIPTION OF THE DRAWINGS

FIG. 2 is a schematic view showing an optical arrangement of a photoelectrical range detecting system of the embodiment shown in FIG. 1.

FIG. 3 is a schematic diagram showing outputs of main circuit blocks in the range detecting circuit and the focus detecting circuit of the embodiment of FIGS. 1 and 2.

FIG. 4 is a schematic electrical circuit diagram showing a second embodiment of the invention.

DETAILED DESCRIPTION OF THE PREFERRED EMBODIMENTS

Figure 1:
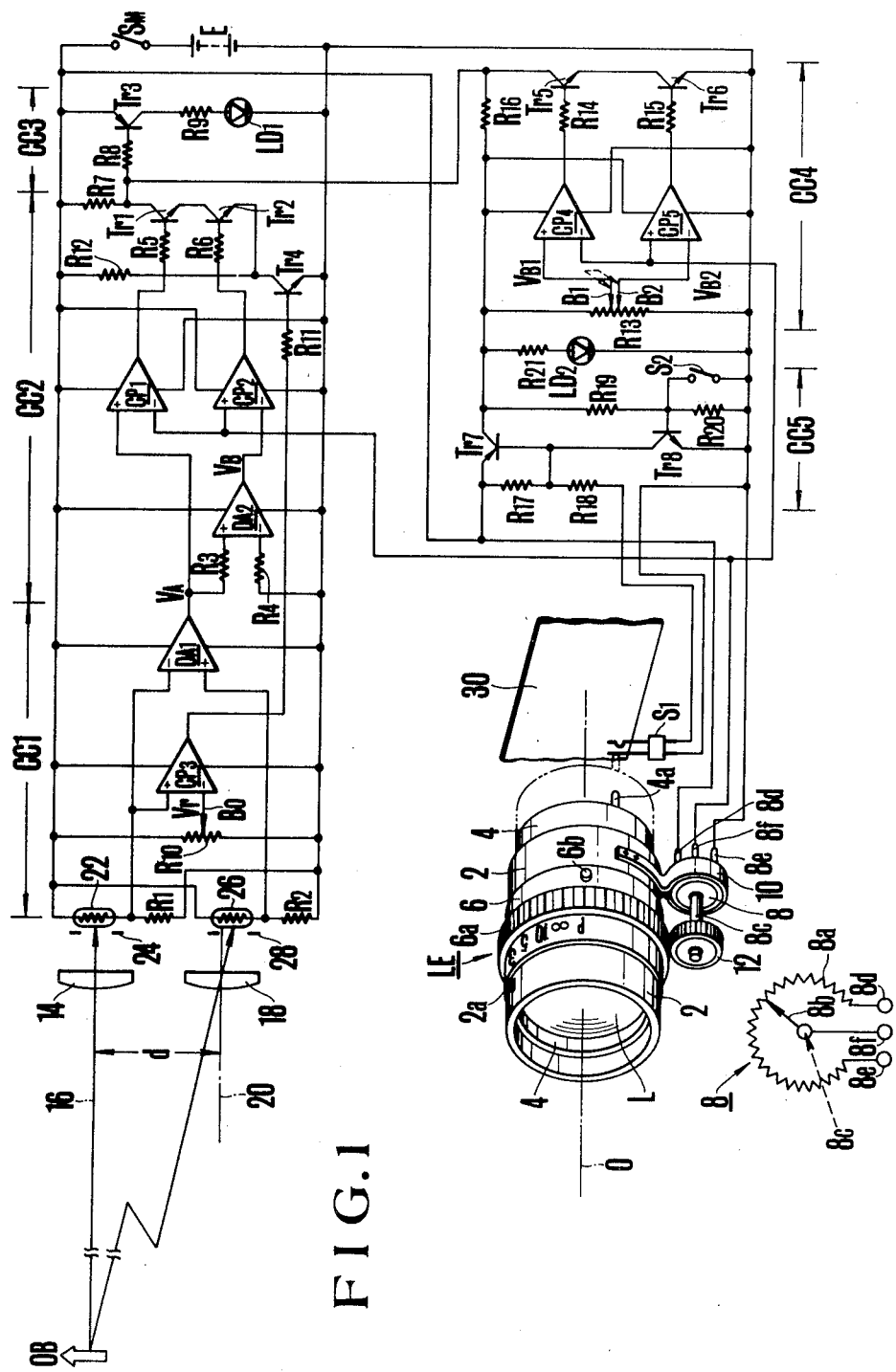
FIG. 1 is a partly diagrammatic and partly perspective view of a first embodiment of a camera having a focusing system according to the present invention.

With reference to FIGS. 1 to 3, the first embodiment of the present invention will now be explained below.

What this embodiment is applied to, though being common to all the other embodiments to be described later, is a camera having a range finder type automatic range detecting system in which two detection images of an object to be photographed are photo-electrically sensed to produce an output signal representative of a distance between the camera and the object and which output is compared by the focus detection circuit with the electrical signal representing the set position of a photo-taking lens to detect the proper focus position of the photo-taking lens to the object. It is, therefore, to be understood that this type automatic focus detecting device is illustrated as a mere example of application of improvements of the invention, and that the improvement of the invention is not confined thereto but applicable to other various types of focus detecting devices such as image sharpness detecting device or the like.

In FIG. 1, there is shown a photo-taking lens assembly LE comprising a fixed tube 2, an axially movable sleeve 4 fixedly carrying a photo-taking lens L and fitted in the tube 2, and an operating ring 6 for focusing mounted on the outer diameter of the tube 2 to be rotatable about an optical axis O of the lens L while being restrained from axial movement. Though not shown, a focusing mechanism of construction known in the art is provided between the sleeve 4 and the ring 6, as, for example, comprising a cam follower pin radially extending from the sleeve 4 through a longitudinal slot in the tube 2 and engaging with a circumferential focusing cam groove of the ring 6 so that rotative movement of the ring 6 is transmitted to axial movement of the sleeve 4 which causes axial adjustment of the lens L along the optical axis O with respect to a film plane 30.

A potentiometer 8 is fixedly carried on the tube 2 by a fastener 10 and is constructed from a resistor winding 8a and a slider 8b, the latter is connected through a shaft 8c to a pinion 12 meshing with a toothed portion 6a of the focusing ring 6. The two ends of the resistor winding 8a are connected to respective terminals 8b and 8e which are connected to positive and negative buses of the circuit of FIG. 1 respectively, while the slider 8b is connected to an output terminal 8f which is connected to both of an automatic focus detecting circuit CC2 and a pan-focus detecting circuit CC4 respectively. The output of the potentiometer 8, therefore, represents the adjusted angular position of the focusing ring 6. From the standpoint of view of the camera of compact structure, it is preferred to construct the potentiometer 8 in such a manner that the resistor winding 8a and the slider 8b are incorporated between the tube 2 and the ring 6.

A distance measuring circuit CC1 includes a pair of photoconductive elements 22 and 26 having image receiving surfaces restricted by respective masks 24 and 28 and positioned behind respective cylindrical lenses 14 and 18. These lenses 14 and 18 constitute an optical system of the so-called range finder type focus detecting device, and have optical axes 16 and 20 respectively oriented in parallel to each other and spaced by a base length d. As is shown in FIG. 2, the first mask 22 has a rectangular opening 24a whose center is aligned with the optical axis 16 of the lens 14, while the second mask 28 has an opening of trapezoid (or triangular) shape with the base having a length equal to the width w of the rectangular opening 24a of the first mask 24, and is positioned as shifted to the left so that the optical axis 20 of the lens 18 intersects the trapezoid opening 28a near the center of the base. Since the combination of the lens 14 and the photoconductive element 22 is adapted as a sighting system for an object OB, in other words, the object OB is aligned with the optical axis 16, the lens 14 always forms a first linear detection image I of the object OB on the photoconductive element 22 through the mask 24 at an almost constant location, in this instance, at the center of the area 24a, independent of the distance between the camera and the object OB, while the second lens 18 forms a second linear detection image of the same object OB on the photoconductive element 26 through the mask opening 28a at a different location in correspondence to the object distance. Namely, the lens 18 formes each images I1, I2 and I3 in correspondence to infinite, intermediate and nearest distance respectively. Accordingly, for an infinitely distant object, the resistance values of the photoconductive elements 22 and 26 are made equal to each other, however, as the object distance is decreased, while the resistance value of the first photoconductive element 22 is maintained constant, the resistance value of the second photoconductive element 26 is increased, and thereby the resulting difference between these resistance values of the both elements 22 and 26 changes as a function of the object distance. On the other hand, when the object brightness level is lowered, both of the resistance values of the photoconductive elements 22 and 26 become high. Thereby, as will be described later in more detail, it is possible to detect whether the brightness level of the object OB is lowered below a predetermined level or not, at which level the focus detection by the focus detecting circuit CC2 is insured, on the basis of the output voltage of the photoconductive element 22.

Turning now to FIG. 1 again, the distance measuring circuit CC1 further includes a differential amplifier DA1 having an inversion input connected to a point on connection between the photoconductive element 22 and a resistor R1 and having a non-inversion input connected to a point on connection between the photoconductive element 26 and a resistor R2, the resistors R1 and R2 having resistance values related to each other so that when the object OB is infinitely distant, the voltage levels of two inputs of the differential amplifier DA1 are made equal to each other. As shown in FIG. 3(a), therefore, the output VA of the amplifier DA1 is zero for the infinitely distance object and takes an increasing voltage value with decrease in the object distance, reaching a maximum at close-ups.

The automatic focus detecting circuit CC2 includes a differential amplifier DA2 for subtracting a predetermined voltage value $\alpha$ from the output voltage VA of the aforesaid differential amplifier DA1, having a non-inversion input connected to the output of the amplifier DA1 through a resistor R3 and having an inversion input connected through a resistor R4 to the negative bus. As shown in FIG. 3(a), therefore, the output voltage VB of the amplifier DA2 may be expressed as $VB = VA - \alpha$. The value $\alpha$ is adjusted by varying the resistance values of the resistors R3 and R4. As will be described later in detail, the smaller the value $\alpha$, the more the accuracy of the focus detection becomes. The automatic focus detecting circuit CC2 further includes a pair of comparators CP1 and CP2 constituting a window type comparating circuit with the first comparator CP1 having (+) and (−) inputs connected to the outputs of the amplifier DA1 and the potentiometer 8 respectively and with the second comparator CP2 having (+) and (−) inputs connected to the outputs of the potentiometer 8 and the amplifier DA2 respectively. Since the potentiometer 8 is adjusted so that the output voltage thereof varies with the photographing distance of the lens L at the same slope and level as those of the output voltage VA of the amplifier DA1, as shown in FIG. 3(b), when the focusing ring 6 is set as being deviated from the exact object distance toward shorter distances, the first comparator CP1 produces an output of low level which is applied through a resistor R5 to a base of a first transistor Tr1, thereby the transistor Tr1 is rendered non-conductive. On the other hand, since the output voltage VB of the amplifier DA2 is adjusted by the resistors R3 and R4 to be lower than the voltage VA by the magnitude $\alpha$, when the lens L is set at a longer distance than the sum of the exact object distance and a distance corresponding to the value $\alpha$, the second comparator CP2 produces an output of low level which is then applied to a second transistor Tr2 through a resistor R6, thereby the transistor Tr2 is rendered non-conductive. In consequence, when the lens L is set at a distance equal to or longer than the exact object distance 1 but shorter than the sum of the exact distance 1 and the distance $\beta$ corresponding to the magnitude $\alpha$, as shown in FIG. 3(b), the outputs of the both comparators CP1 and CP2 become high, thereby the first and second transistors Tr1 and Tr2 are rendered conductive simultaneously. As the transistors Tr1 and Tr2 are connected in series to each other and to a transistor Tr4 between the positive and negative buses, and when the object brightness level sensed by the first photoconductive element 22 is higher than a reference level set in a semi-fixed resistor R10 to which the reference level corresponding to the object brightness at which the operations of the circuits CC1 and CC2 are insured, is set by a slide Bo, a third comparator CP3 produces an output of high level which is applied to the base of the transistor Tr4 through a resistor R11, thereby the transistor Tr4 is rendered conductive. Such conduction of all the transistors Tr1, Tr2 and Tr4 causes conduction of a transistor Tr3 in a focus indication circuit CC3, thereby a light-emitting diode LD1 is energized with power supply from a battery E, provided that a main switch SM connected in the positive terminal of the battery E and the positive bus is closed. The resistors R5 to R12 serve as protection elements for the transistors Tr1 to Tr4 and diode LD1.

A supplementary circuit is indicated by CC4 in the form of the pan-focus detecting circuit rendering it possible to set the lens L at a hyper-focal distance position independently of the aforementioned automatic focus detecting circuit CC2 when it is proven that the satisfactory operation of the circuits CC1 and CC2 can not be fully assured. The circuit CC4 includes a variable resistor R13 for setting a hyper-focal distance depending upon the size of a diaphragm aperture, for example. As is shown in the art, the pan-focus range (from a particular distance to infinity in which the image of the object is formed with an acceptable sharpness on a film plane) for the photographic objectives generally depends upon its focal length f, and diaphragm value F. For example, with an objective having f=35 mm and F 2.0, the hyper-focal distance is determined to be about 17.2 meters, and therefore, the pan-focus range to be from 8.6 meters to infinity. When the size of diaphragm aperture is decreased to F 4.0, the hyper-focal distance is shortened to about 8.6 meters with increase in the pan-focus range to 4.3 m$-\infty$. At F 5.6 and F 8.0, the hyper-focal distances are 6.2 and 4.4 meters respectively with the pan-focus ranges 3.1 m$-\infty$, and 2.2 m$-\infty$. To allow for the setting of the lens L to the hyper-focal distance position, a first slider B1 of the variable resistor R13 is arranged to cooperate with a not shown diaphragm control mechanism. A second slider B2 is arranged to move together with the first slider B1 so that the output voltage VB2 appearing at the second slider B2 is varied as a function of $VB2=VB1-\alpha$, where VB1 is the voltage appearing at the first slider B1. The parameter $\alpha$ is preferably as small as possible likewise the difference $\alpha$ between the output voltage VA and VB of the above mentioned differential amplifiers DA1 and DA2, for the purpose of performing pan-focus detection with higher accuracy. The sliders B1 and B2 are connected to respective comparators CP4 and CP5 at one inputs of opposite sign, namely, (+) and (−) inputs thereof respectively, while the other inputs of the comparators CP4 and CP5 are connected by way of a common lead to the output of the potentiometer 8. Likewise as in the circuit CC2, therefore, when the output of the comparators CP4 and CP5 are simultaneously of high level, in other words, when the output voltage of the potentiometer 8 lies within a voltage range of from VB2 to VB1, the setting of the lens L to the pan-focus position may be considered to be proper. It is noted that when the output of the comparator CP4 is of low level, that is, when the output voltage of the potentiometer 8 is higher than VB1, the photo-taking lens L is focused at a shorter distance than the hyper-focal distance. Conversely, when the output of the comparator CP5 is of low level, that is, the output voltage of the potentiometer 8 is lower than VB2, the photo-taking lens L is focused at a longer distance than the hyper-focal distance. The outputs of the comparators CP4 and CP5 are connected to bases of transistors Tr5 and Tr6 through resistors R14 and R15 respectively. The transistor Tr5 has a collector connected to the base of the switching transistor Tr3 in the focus indication circuit CC3 and an emitter connected to the collector of the transistor Tr6 whose emitter is connected to the negative bus, so that when the lens L is set to the pan-focus position, the light-emitting diode LD1 is energized. The resistors R14 to R16 serve as protection elements.

As understood from the structure described above, the approximate focus position of the photo-taking lens L obtained by the function of the pan-focus detecting circuit CC4 may naturally coincide with the exact focus position in regard with the object OB.

A power supply and holding circuit CC5 for the pan-focus detecting circuit CC4 includes a switch S1 arranged to be closed when the focusing ring 6 is turned to place a symbol P which is located at a point beyond the infinite end of a range of distances in coincidence with an index 2a on the outer periphery of the tube 2, so that the lens L is further moved rearwardly beyond the infinite focus position as a projection 4a rearwardly extending from the sleeve 4 pushes a movable contact of the switch S1. The lens assembly LE is so constructed that the rotating of the ring 6 from the position as to the position P is restricted by a not shown restricting mechanism provided between the ring 6 and the tube 2 and the restriction by the restricting mechanism can be released by the depression of a release button 6b provided on the ring 6. Said switch S1 is connected at one terminal to the negative bus and at the other terminal to the positive bus through a voltage divider of resistors R17 and R18 connected in series to each other. Connected to the output of the voltage divider is a base of a transistor Tr7 with an emitter connected to the positive bus and with a collector connected to control power supply to the circuit CC4 and a display circuit, the latter comprises a light-emitting diode LD2 and a resistor R21 connected in series to each other. In order to retain the power supply to the circuit CC4 regardless of the fact that the once closed switch S1 is opened as the focusing ring 6 is turned to set the lens L to the hyper-focal distance, there is provided a transistor Tr8 with a base connected to a point on connection between a resistors R19 and R20 which are connected between the collector of the transistor Tr7 and the negative bus, with a collector connected to the base of the transistor Tr7 and with an emitter connected to the negative bus. A power supply stop switch S2 is connected across the base and emitter of the transistor Tr8. The switch S2 is arranged to be closed manually or in association with camera wind-up operation. It is to be noted here that the button 6b serves to prevent accidental closure of the switch S1 from occurring for example, when the focusing ring 6 is operated near the infinite end of the distance range.

The operation of the camera of FIG. 1 is as follows. Now assuming that the optical axis O of the photo-taking lens L is aligned to the object OB at the distance l from the camera, then the optical axis 16 of the cylindrical lens 14 is in alignment with the object OB to form the detection image I of the object OB through the rectangular opening area 24a on the photoconductive element 22, while the optical axis 20 of the cylindrical lens 18 is taken off from the object OB to thereby form the detection image of the object OB on the photoconductive element 26 at a location shifted to the left from the base of the trapezoid open area 28a in correspondence to the object distance l. Under this condition, when the power switch SM is closed to supply the distance measuring circuit CC1 and the automatic focus detecting circuit CC2 with electrical energy from the battery E, the distance measuring circuit CC1 produces an output voltage VA which is a function of the camera-to-object distance only (hereinafter referred to as VA(l)) as shown in FIG. 3(a) and which is then applied to the non-inversion input of the first comparator CP1 of the circuit CC2. At the same time, a voltage VB(l)=VA(l)−α appears at the inversion input of the second comparator CP2 as shown in FIG. 3(a). If the photo-taking lens L is not focused on the object OB, any one of the outputs of the comparators CP1 and CP2 is of low level so that the collector of the transistor Tr1 remains unchanged from high level, and therefore, the light-emitting diode LD1 remains de-energized. Upon rotation of the focusing ring 6 about the optical axis O of the photo-taking lens L, the photo-taking lens L is shifted along the axis O and at the same time, the output voltage of the potentiometer 8 is varied as a function of the lens position. When the photo-taking lens L is focused at a distance in a range of from l to l+β, as will be understood from FIG. 3(b), the output voltage of the potentiometer 8 lies within a voltage range of from VA(l) to VB(l) so that the outputs of the comparators CP1 and CP2 are simultaneously changed to high level as will be seen from FIG. 3(c) and 3(d). On the other hand, in this state if the brightness level of the object OB is above the lower limit of a dynamic range of light response of the circuit CC1, and therefore if the voltage appearing at a point of conjunction of the resistor R1 and the element 22 is higher than the voltage Vr appearing at the slide Bo of the semi-fixed resistor R10, the output of the comparator CP3 takes high level at which the transistor Tr4 is in conductive state. Thereby, at a time when the outputs of the comparators CP1 and CP2 are simultaneously of high level, the transistors Tr1 and Tr2 are rendered conductive which in turn causes the transistor Tr3 to be conductive as shown in FIG. 3(e) to energize the light-emitting diode LD1. As this light-emitting diode LD1 is positioned to be visible in the camera view finder, the photographer looking through the finder is therefore informed of a fact that the photo-taking lens L is set to a sharpest focus position. As soon as the light-emitting diode LD1 is lighted on, the photographer needs only to remove his hand from the focusing ring 6, and then he may turn to depress a shutter release button not shown.

On the other hand, if the brightness level of the object OB is below the lower limit of the dynamic range of light response of the distance measuring circuit CC1, and therefore the voltage appearing at the conjunction between the resistor R1 and the photoconductive element 22 is lower than that Vr, then the output of the comparator CP3 is of low level at which the transistor Tr4 is in non-conductive state. Therefore, in this case, the outputs of the comparators CP1 and CP2 can not contribute to the conduction of the transistor Tr3, so that any setting of the focusing ring 6 does not lead to the energization of the light emitting diode LD1. Consequently, in this case, the photographer needs at first to turn the focusing ring 6 to place the infinite distance symbol in coincidence with the index 2a, then to depress the button 6b to release the focusing ring 6 from restriction by the not shown restricting mechanism, and then to further turn the ring 6 in the same direction until the ring 6 is automatically arrested in a position where the symbol P is aligned with the index 2a, and where the switch S1 is closed by the projection 4a. Such closure of the switch S1 causes conduction of the transistor Tr7 to start power supply to the pan-focus detecting circuit CC4 and also to the light-emitting diode LD2, thereby the photographer is informed of the fact that the pan-focus detecting circuit CC4 is set in the operative state by the lighted-on of the light-emitting diode LD2. Such conduction of the transistor Tr7 also causes conduction of the transistor Tr8 which in turn retains the conduction of the transistor Tr7 after the switch S1 is opened. After the light-emitting diode LD2 is lighted on, the photographer may turn the focusing ring 6 in the reverse direction from the P position. At a time when the output voltage of the potentiometer 8 lies within a voltage range of VB2 to VB1, the outputs of the comparators CP4 and CP5 change to high level simultaneously at which the transistors Tr5 and Tr6 are rendered conducting and therefore the transistor Tr3 is rendered conducting to energize the light-emitting diode LD1 in the focus indication circuit CC3, thereby the photographer is informed of the fact that the photo-taking lens L is focused at a hyper-focal distance set in the resistor R13 as a function of the size of diaphragm aperture. For example, if the diaphragm value is F 4.0, the photo-taking lens L is focused at a distance of 8.6 meters. This corresponds to a pan-focus range of from 4.3 to infinity. For a principal object at a distance of 4.3 meters, the photo-taking lens L forms an image of that object with an acceptable sharpness on the film plane 30.

In this case, the smaller the size of diaphragm aperture, the wider the pan-focus range becomes. However, the use of a smaller size of diaphragm aperture, at the low brightness of the object will lead to under-exposure of the film. To avoid this, if the size of diaphragm aperture is increased, the pan-focus range is narrowed to decrease the percentage of photographs which are found to be acceptable. On this account, with a general-purpose camera, it is most desirable in practice to combine as a slow shutter speed as possible with as a smaller size of diaphragm aperture as possible so that as a wide pan-focus range as possible can be obtained.

After the setting of the focusing ring 6 to the pan-focus position has been accomplished, the photographer needs to close the switch S2, causing the transistor Tr8 to be rendered non-conductive and then causing the transistor Tr7 to be rendered non-conductive. In this embodiment of FIG. 1, the switch S2 is arranged to be operated manually, but may be otherwise arranged to be closed in response to actuation of a shutter button or a film winding lever not shown.

The light-emitting diode LD2 also may be positioned in the camera view finder. If so, it is preferred to provide suitable means for discriminating the two light-emitting diodes LD1 and LD2 from each other. For example, the first light-emitting diode LD1 emits a blue light, and the second light-emitting diode LD2 emits a red light.

It will be seen from the foregoing description that the first embodiment of the invention enables a photographer to perform the setting of the distance adjusting ring at a proper position even when the satisfactory detection of a sharpest focus can not be fully assured from the automatic focus detecting device.

FIG. 4 shows a second embodiment of the invention which is different from the first embodiment of FIGS. 1 to 3 in that a hyper-focal distance setting circuit CC6 is automatically rendered operative by a power supply control circuit CC7 when the object brightness lowered below a predetermined level, and that there are provided a pair of meters to enable the photographer to be informed not only of when the lens L is in either sharpest focus position or pan-focus position but also of, if the lens L is not in focus, the direction in which an adjustment must be made to bring the lens L into focus. Therefore, in this embodiment, the focus detection circuit CC2 and the focus indication circuit CC3 are useless.

The two meters 36 and 38 are positioned in concentric relation to each other and have pointers 36a and 38a respectively arranged to be movable over a distance scale 34 in or near the camera view finder 32. A coil of the first meter 36 is connected at one end to the negative bus and at the other end to a pole of a single-pole double-throw switch Sc with a first throw a connected to the output of the differential amplifier DA1 and with a second throw b connected to the slider B1 of the variable resistor 13. The change-over of the pole of the switch Sc is controlled by a relay RL in such a manner that when the output voltage of the comparator CP3 changes from high to low level to render a transistor Tr9 in the power supply control circuit CC7 conductive with simultaneous occurrence of conduction of the transistor Tr7, the relay RL is energized to move the pole of the switch Sc from "a" position to "b" position, where the distance measuring circuit CC1 is cut off from the meter 36 but instead the diaphragm responsive variable resistor R13 for setting a hyper-focal distance is connected thereto. The second meter 38 has a coil connected at one end to the negative bus and at the other end to the output of the potentiometer 8.

Now assuming that the object brightness level is above the lower limit of the dynamic range of light response of the distance measuring circuit CC1, then the voltage appearing at the conjunction of the photoconductive element 22 and the resistor R1 is higher than the V'r (in this case the reference voltage V'r given through the slide Bo is adjusted in correspondence to the lower object brightness level at which the operation of the distance measuring circuit CC1 is insured) appearing at the output of the semi-fixed resistor R10, causing the comparator CP3 to produce an output of high level at which the transistor Tr9 is in non-conductive state, and therefore the transistor Tr7 is in non-conductive state. Accordingly the switch Sc is set in "a" position, where the output of the distance measuring circuit CC1 is applied to the first meter 36 with the deflected position of the pointer 36a indicating a distance between the camera and the object.

While looking through the finder, the photographer needs to turn the focusing ring 6 is a direction such that the pointer 38a of the second meter 38 follows up the first pointer 36. When these two pointers 36a and 38a come to overlap one upon the other, the image formed by the lens L on the film 30 is in sharpest focus.

On the other hand if the object brightness level lowered below the lower limit of the dynamic range, then the output of the comparator CP3 changes to low level at which the transistors Tr9 and Tr7 in the power supply control circuit CC7 are rendered conductive successively to energize the relay RL, thereby the circuit CC1 is cut off from the first meter 36 and instead, the hyper-focal distance setting circuit CC6 is brought into connection therewith through the switch Sc. The deflected position of the pointer 36a is dependent upon the size of diaphragm aperture as schematically shown by a dashed line and represents a hyper-focal distance in cooperation with the distance scale 34. The lens L can be focused at this hyper-focal distance by turning the ring 6 until the pointer 38a coincides with the pointer 36a. It is to be noted that the switches S1 and S2 and the restricting mechanism for the focusing ring 6 of the first embodiment have no use in the second embodiment.

Figure 5:
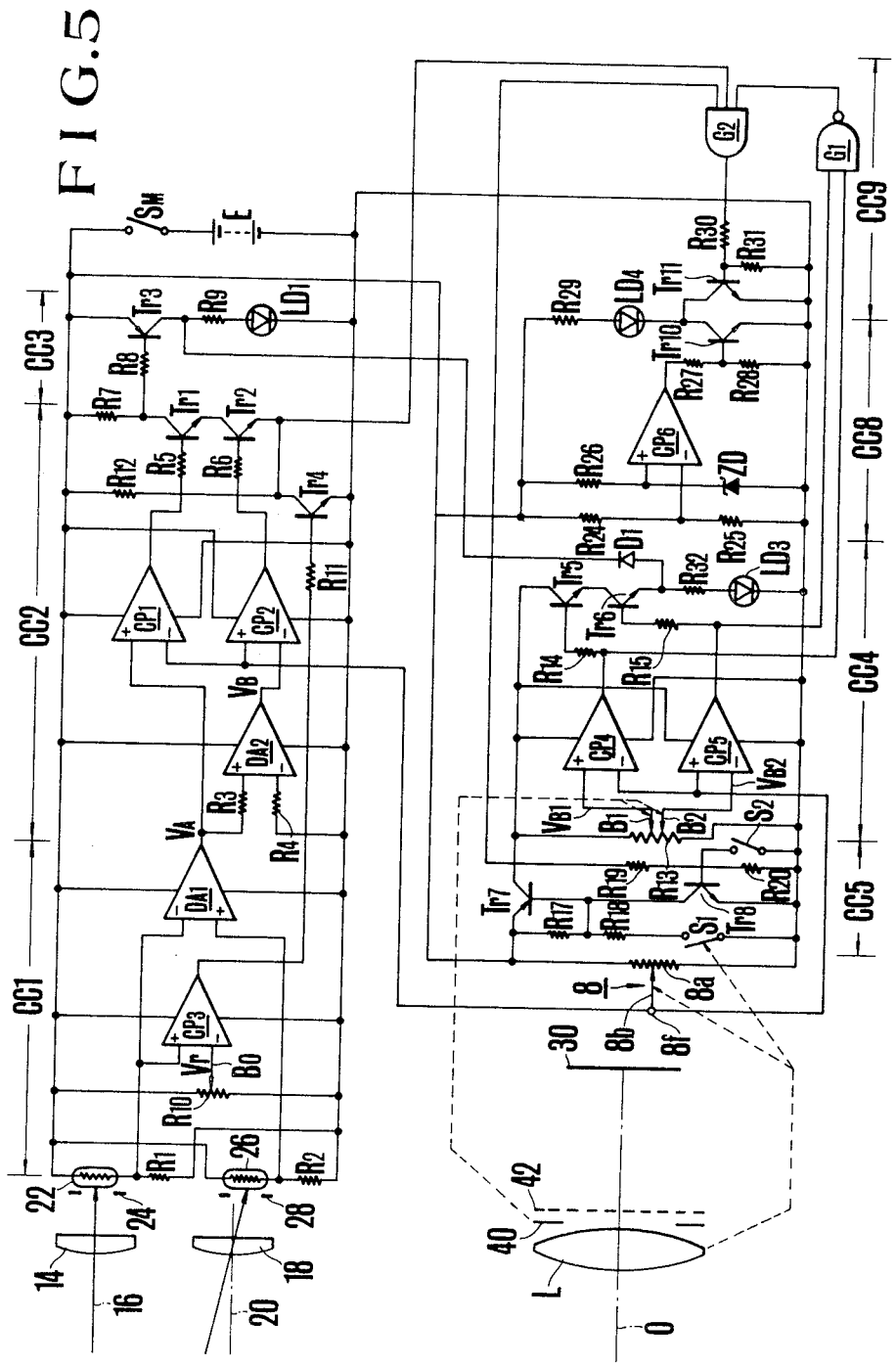
FIG. 5 is a similar diagram showing a third embodiment of the invention.

FIG. 5 shows a third embodiment of the invention which may be considered to be an example of improvement of the first embodiment of FIG. 1 by addition of a voltage drop detecting circuit CC8.

This circuit CC8 comprises a voltage divider consisting of a pair of resistors R24 and R25 and connected across the battery E, a reference voltage source consisting of a resistor R26 and a Zener diode ZD and connected in series to each other between the positive and negative buses, a comparator CP6 having (+) and (−) inputs connected to the outputs of the reference voltage source and the voltage divider respectively, a switching transistor Tr10 with a base connected to a point on connection of resistors R27 and R28 between the output of the comparator CP6 and the negative bus with an emitter connected to the negative bus, and with a collector connected to the cathode of a light-emitting diode LD4 and a resistor R29 connected between the anode of the diode LD4 and the positive bus. Accordingly, when the actual voltage of the battery E is below a voltage level held by the Zener diode ZD, the comparator CP6 produces an output voltage of high level at which the transistor Tr10 is rendered conductive to energize the diode LD4, thus indicating that the actual voltage of the battery E drops below a satisfactory operating level for the distance measuring circuit CC1 and the focus detecting circuit CC2. In this circuit, the reference voltage level to be held by the Zener diode ZD is adjusted by the selection of the resistance value of the resistor R26 to a level of the voltage divider R24, R25 when the voltage level of the battery E lies at a lower level at which the operations of the circuits CC1 and CC2 are insured. The resistor R29 serves as a protection element for the light-emitting diode LD4.

A circuit CC9 is a display control circuit provided for indicating that the hyper-focal distance setting circuit CC4 is rendered operative by the closure of the switch S1 at the state that the object brightness level lowered below the lower limit of a dynamic range of light response of the distance measuring circuit CC1. The circuit CC9 comprises a transistor Tr11 with a collector connected to the collector of the transistor Tr10, with an emitter connected to the negative bus and with a base connected through a resistor R31 to the negative bus, a NAND gate G1 having two inputs connected to the respective outputs of the comparator CP4 and CP5, and an AND gate G2 having three inputs: one is connected to the output of the NAND gate G1; the second is connected to the collector of the transistor Tr4; and the third is connected to the collector of the transistor Tr7. The output of the AND gate G2 is connected to the base of the transistor Tr11 through a resistor R30.

The pan-focus detecting circuit CC4 of FIG. 5 is slightly different from that of FIG. 1 in that a light-emitting diode LD3 is connected in the emitter stage of the transistor Tr6 together with a protection resistor R32, and that the emitter of the transistor Tr6 is connected through a reverse current preventing diode D1 to a point on connection between the protection resistor R9 for the light-emitting diode LD1 and the collector of the transistor Tr3 in the circuit CC3. Therefore, when the lens L is focused at a hyper-focal distance by the use of the circuit CC4, both of the light-emitting diodes LD1 and LD3 are simultaneously lighted on.

In this construction, if the voltage level of the battery E is above the satisfactory operating level for the circuits CC1 and CC2, the voltage drop detecting circuit CC8 has no effect on the indication by the light-emitting diode LD4. On the other hand, when the voltage level of the battery E drops below the level, the voltage appearing at the conjunction of the resistors R24 and R25 becomes lower than that appearing at the conjunction of the resistor R26 and the Zener diode ZD, causing the output of the comparator CP6 to change to high level at which the transistor Tr10 is rendered conductive to energize the light-emitting diode LD4.

Under this condition, it is possible that the outputs of the comparators CP1 and CP2 of the automatic focus detecting circuit CC2 happen to be of high level simultaneously during focusing operation of the lens L. This will lead to the conduction of the transistors Tr1 and Tr2 (provided that the transistor Tr4 is in conductive state). In this case, the light-emitting diode LD1 is caused to be lighted on. But, since the satisfactory detection of sharpest focus is not assured due to the drop of the voltage of the battery E, it is preferred to make use of the pan-focus detecting circuit CC4 in the adjusting of the lens L rather than by the use of the focus detecting circuit CC2.

With such battery unchanged by new one, therefore, the photographer may proceed to turn the focusing ring 6 so as to close the switch S1. And when the lens L is focused at a hyper-focal distance set in the resistor R13, the output voltages of the comparators CP4 and CP5 change to high level simultaneously at which the transistors Tr5 and Tr6 and rendered conductive to energize the light-emitting diode LD3. At the same time, a current flowing through the transistors Tr5 and Tr6 is directed through the diode D1 and the protection resistor R9 to the light-emitting diode LD1 also. As a result, both of the light-emitting diodes LD1 and LD3 are lighted on, informing the photographer of the fact that the photo-taking lens L is set to the pan-focus position.

Though the battery voltage is above the satisfactory operating level, when the object brightness level lowered below the dynamic range of light response of the distance measuring circuit CC1, the pan-focus detecting circuit CC4 is made use of. In this case, since the output of the comparator CP3 is of low level, a voltage of high level appears at the collector of the transistor Tr4 due to the non-conduction thereof, so that the second input of the AND gate G2 is of high level. Next, when the switch S1 is closed by the rearward movement of the sleeve 4, the transistor Tr7 is rendered conductive so that the third input of the AND gate G2 is of high level. And in this state, if the photo-taking lens L is not yet adjusted to the hyper-focal distance position set by the resistor R13, any one of the comparators CP4 and CP5 produces an output of low level, so that the NAND gate G1 produces an output of high level which is applied to the first input of the AND gate G2. Since all the inputs of the AND gate G2 are of high level, the transistor Tr11 is rendered conducting to energize the light-emitting diode LD4, thereby the indication that the pan-focus detecting circuit CC4 is rendered operative, is performed. And thereafter when the lens L is focused at the hyper-focal distance, the output of the comparators CP4 and CP5 becomes of high level simultaneously, so that both of the light-emitting diodes LD1 and LD3 are lighted on, thereby the indication that the lens L is set to the pan-focus position, is performed. At this time, the output of the NAND gate G1 changes to low level, so that the output of the AND gate G2 changes to low level, thereby the transistor Tr11 is rendered non-conductive to light off the light-emitting diode LD4.

The display system of the third embodiment of FIG. 5 may be summarized as follows. The light-emitting diode LD1 when lighted on indicates that the normal operation of focus adjustment has been performed. The light-emitting diodes LD1 and LD3 when lighted on simultaneously indicate that the photo-taking lens L is set to the pan-focus position. On the other hand, the light-emitting diode LD4 when lighted on indicates either that the battery voltage falls below the satisfactory operating level, or that, though the battery voltage is above the level, the object brightness level is below the dynamic range of the distance measuring circuit CC1, while the setting of the lens L to the pan-focus position is not accomplished yet.

As all the light-emitting diodes are positioned in the camera view finder, it is desirable that these indications are discriminated from one another as has been mentioned before. For example, if a green light-emitting diode is selected for employment as the light-emitting diode LD1, it is preferred to select orange and red light-emitting diodes as the light-emitting diodes LD3 and LD4 respectively.

Figure 6:
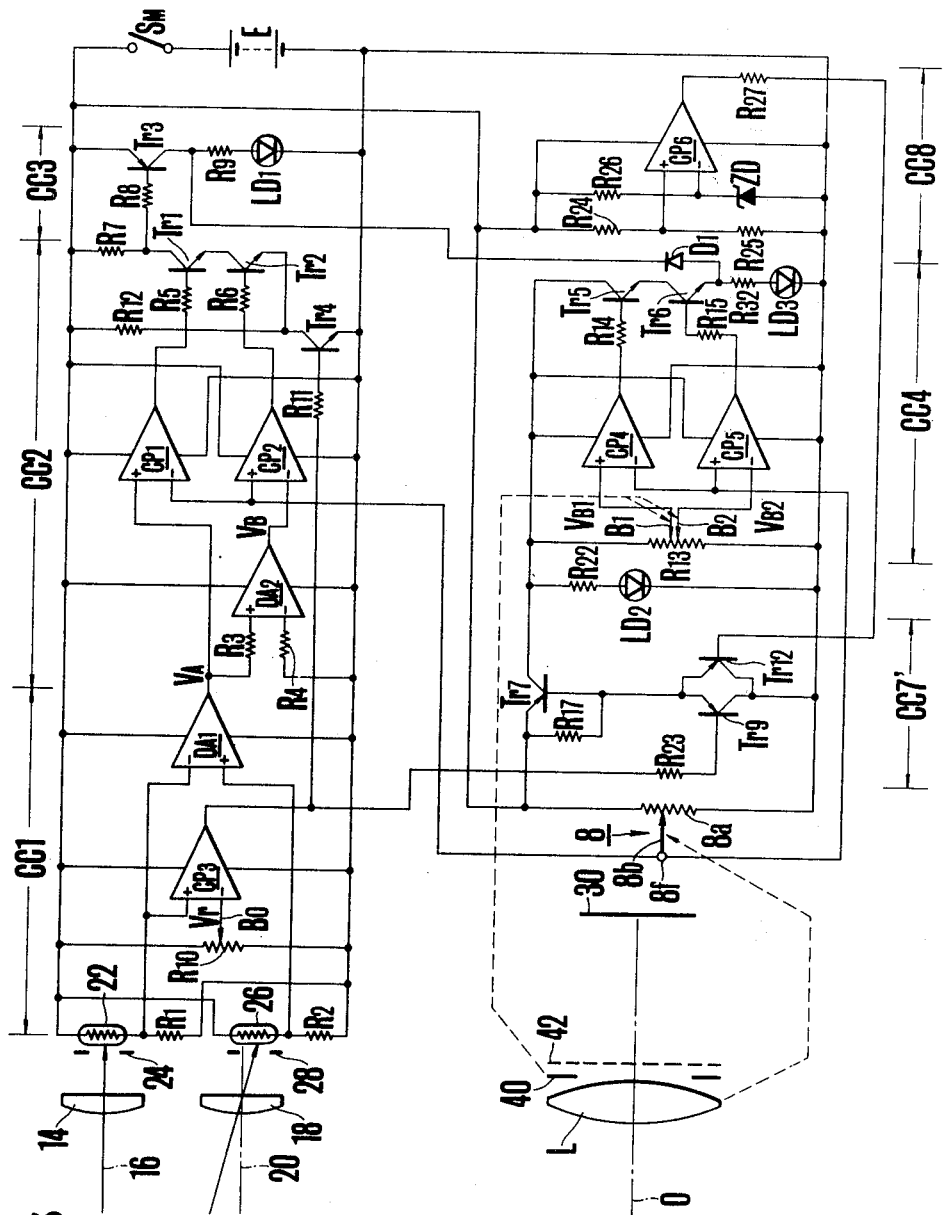
FIG. 6 is a similar diagram showing a fourth embodiment of the invention.

FIG. 6 shows a fourth embodiment of the invention which may be considered to be an example of improvement of the third embodiment of FIG. 5 and where the pan-focus detecting circuit CC4 is automatically rendered operative in response to drop of the object brightness level and/or the battery voltage below the respective predetermined levels. For this purpose, the power supply retaining circuit CC5 of FIG. 5 is modified to a power supply control circuit CC7'. In addition to the power supply control transistor Tr7 and the resistor R17, the circuit CC7' further includes transistors Tr9 and Tr12 with emitters connected to the base of the transistor Tr7, with collectors connected to the negative bus and with bases connected to the output of the comparator CP3 through the resistor R23 and to the output of the comparator CP6 through the resistor R27 respectively. A further modification is that the two inputs of the comparator CP6 is reversed in connection to the voltage divider R24 and R25 and the reference voltage source R26 and ZD, so that when the battery voltage drops below the satisfactory operating level, the output of the comparator CP6 changes from high to low level at which the transistor Tr12 is rendered conductive. Instead of using the light-emitting diode LD4 as a warning display element for the battery voltage drop, the light-emitting diode LD2 is utilized to be connected between the pan-focus detecting circuit CC4 and the circuit CC7', thereby giving an advantage of omitting the display control circuit CC9. Further there is no need to provide the P position and the restricting mechanism for the focusing ring 6, likewise as in the second embodiment of FIG. 4.

When the object brightness level lowered to cause change of the output of the comparator CP3 from high to low level, the first transistor Tr9 is rendered conductive, while when the battery voltage lowered to cause change of the output of the comparator CP6 from high to low level, the second transistor Tr12 is rendered conductive, so that in both cases, the pan-focus detecting circuit CC4 is rendered operative, since the transistor Tr7 is rendered conductive. At the same time, the light-emitting diode LD2 is lighted on to indicate that the pan-focus detecting circuit CC4 is set in the operative state. For this reason, the light-emitting diode LD2 may be regarded as providing a warning indication for either or both of the object brightness and battery voltage drops.

Figure 7:
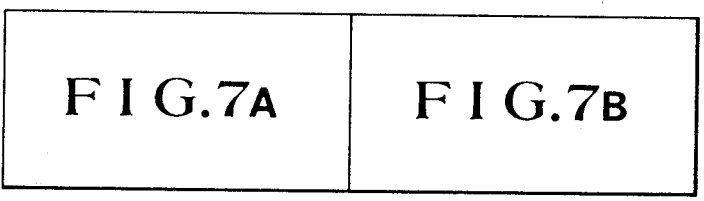
FIGS. 7, 7A and 7B are a similar diagram showing a fifth embodiment of the invention.
Figure 7A:
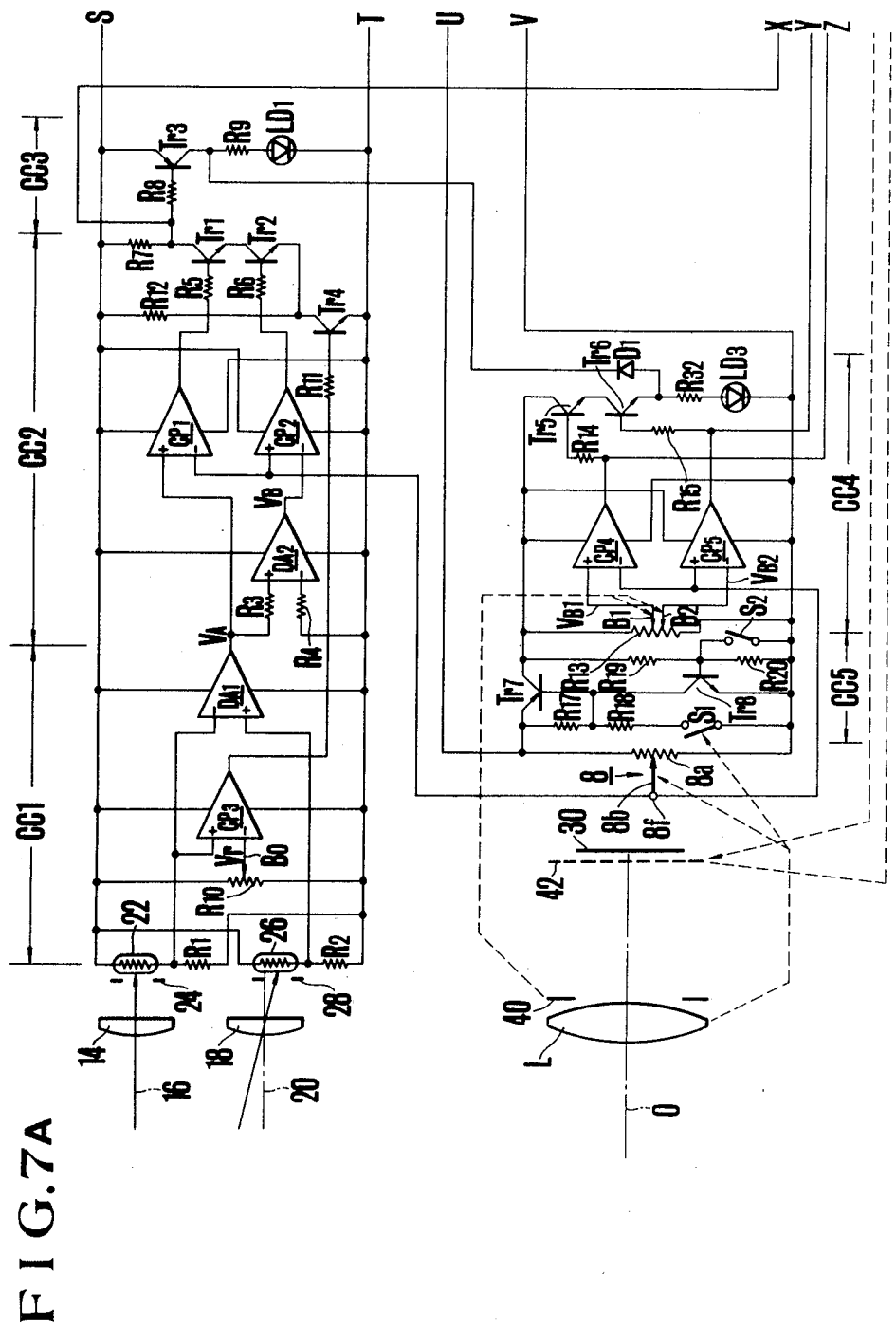
Figure 7B:
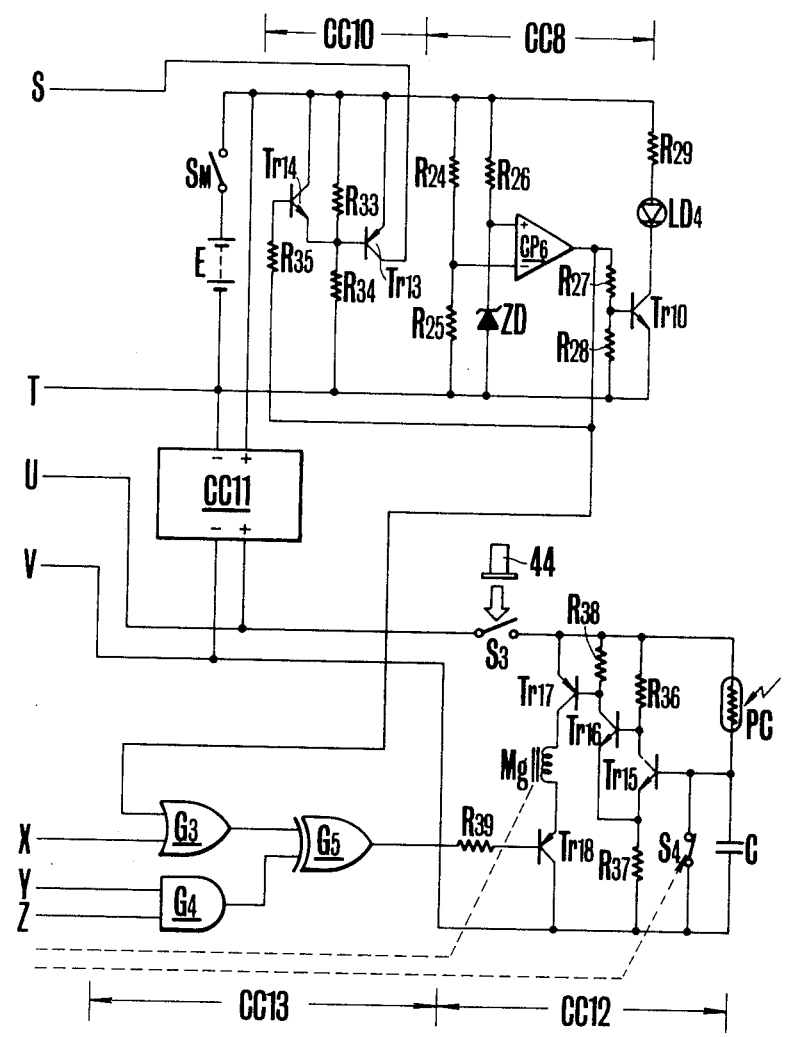

In FIG. 7, there is shown a fifth embodiment of the invention with FIG. 7A being the left-hand portion of a schematic circuit diagram of the camera focusing control device and with FIG. 7B being the right-hand portion of the circuit and a shutter control circuit. This embodiment is based on the third embodiment of FIG. 5 and adapted to co-operate with the shutter control circuit in such a manner that only when the setting of the photo-taking lens L to a sharpest focus position by the use of the automatic focus detecting circuit CC2 has been completed, or the setting of the photo-taking lens L to a pan-focus position by the use of the pan-focus detecting circuit CC4 has been completed, provided that either or both of the object brightness and battery voltage drops is or are resulted, the shutter control circuit is rendered operative. Further, when the battery voltage lowered below the predetermined level, the power supply to the distance measuring circuit CC1, focus detecting circuit CC2 and indication circuit CC3 is cut off.

A circuit CC10 for controlling power supply to the circuits CC1, CC2 and CC3 comprises a first transistor Tr13 with an emitter connected to the main switch SM, with a collector connected to the positive bus of the circuit of FIG. 7A which is similar to that of FIG. 5 except for omission of the display control circuit CC9, and a base connected to a point on connection between resistors R33 and R34 between the positive and negative buses, and a second transistor Tr14 with a collector connected to the positive bus, with an emitter connected to the point and with a base connected through a resistor R35 to the output of the comparator CP6 of the circuit CC8 which is similar to that of FIG. 5.

A constant voltage circuit CC11 is provided for power supply to the pan-focus detecting circuit CC4 through the power supply control and holding circuit CC5 and also to a shutter control circuit CC12.

The shutter control circuit CC12 comprises a photocell PC positioned to receive light from the object to be photographed, a timing capacitor C connected in series to the photo-cell, a Schmitt type trigger circuit consisting of transistors Tr15 to Tr17 and resistors R36 to R38 responsive to the output of the timing circuit PC and C for energizing and de-energizing a magnetic winding Mg for controlling opening and closing operation of a shutter 42, a release switch S3 arranged to be closed when a shutter release button 44 is depressed and connected in the positive bus, a time-count start switch S4 arranged to be opened when the shutter is fully opened and connected across the timing capacitor C, and a transistor Tr18 with an emitter connected to the magnetic winding Mg, with a collector connected to the negative bus and with a base connected through a resistor R39 to the output of a logic gating circuit CC13.

The logic gating circuit CC13 is provided for controlling the operation of the shutter control circuit CC12 and comprises an OR gate G3 having two inputs one of which is connected to the output of the comparator CP6 and the other of which is connected to the output of the circuit CC2, an AND gate G4 having two inputs connected to the respective outputs of the comparators CP4 and CP5, and an exclusive OR gate G5 having two inputs connected to the respective outputs of the OR and AND gates G3 and G4.

In this case, the shutter 42 is a focal-plane shutter having leading and rear curtains, and when the magnet Mg is excited the rear curtain is stopped while the engagement of the leading curtain is released and allowed to run so that the shutter is opened. When the magnet Mg is nulfied, the engagement of the rear curtain is released and allowed to run so that the shutter is closed. Also, the film winding-up is prohibited unless the shutter 42 is released. Further, the time-count starting switch S4 is so designed to be released by the leading curtain when the shutter is fully opened. Also the shutter control circuit CC12 is so designed to be supplied with power by the constant voltage circuit CC11 so as to prevent variation in the exposure time due to variation in the voltage of the power source.

In this construction, if the battery voltage is above the satisfactory operating level, the voltage drop detecting circuit CC8 produces an output of low level, so that the transistor Tr14 in the power supply control circuit CC10 is rendered non-conductive thereby the transistor Tr13 is rendered conductive to supply the distance measuring circuit CC1, focus detecting circuit CC2 and indication circuit CC3 with electrical power from the battery, provided that the main switch SM is closed. When the brightness level of the object OB is above the predetermined level, the normal focusing by the use of the focus detecting circuit CC2 is possible. With the photo-taking lens L is not focused on the object OB yet, either one of the comparators CP1 and CP2 produces an output of low level so that a voltage of high level appears at the collector of the transistor Tr1. Under this condition, therefore, the OR gate G3 produces an output of high level. Since the pan-focus detecting circuit CC4 is in the inoperative state, the AND gate G4 produces an output of low level. Responsive to these outputs, the exclusive OR gate G5 produces an output of high level at which the shutter control circuit CC12 remains inoperative. In other words, even when the shutter release button 44 is depressed to close the switch S3, the transistor Tr18 is prevented from conducting so that there is no possibility of energizing the magnetic winding Mg, and therefore the shutter remains idle.

When the photo-taking lens L is properly focused on the object OB, both of the comparators CP1 and CP2 produces outputs of high level simultaneously, so that a voltage of low level appears at the collector of the transistor Tr1, thereby the light-emitting diode LD1 is lighted on. At this time, because of the appearance of the voltages of low level at the two inputs of the OR gate G3, the output of the OR gate G2 changes to low level, and therefore the output of the exclusive OR gate G5 changes to low level at which the shutter control circuit is rendered operative. When the shutter release button 44 is depressed, the switch S3 is closed and thereby the transistors Tr17 and Tr18 are rendered conducting to energize the magnetic winding Mg. Then the shutter 42 is opened and when the shutter 42 is fully opened, the start switch S4 is opened to start charging of the timing capacitor C. When the voltage on the capacitor C has reached a predetermined level, the transistor Tr15 is rendered conductive which in turn causes non-conduction of the transistor Tr17, thereby the magnetic winding Mg is deenergized to release a rear curtain of the shutter from latching.

With the battery voltage is above the level, when the object brightness level lowered below the dynamic range of the distance measuring circuit CC1, the transistor Tr4 is rendered non-conductive, so that the voltage appearing at the collector of the transistor Tr1 is maintained at high level, and therefore the output of the OR gate G3 is maintained at high level. In this case, the pan-focus detecting circuit CC4 is made use of. In this state, when the photo-taking lens L is not yet adjusted to the hyper-focal distance position, one of the comparators CP4 and CP5 produces output of low level and therefore the AND gate G4 produces an output of low level. Responsive to these outputs, the exclusive OR gate G5 produces an output of high level at which the shutter control circuit CC12 remains inoperative.

When the lens L is focused at the hyper-focal distance, the outputs of the comparators CP4 and CP5 comes to high level simultaneously, and the light-emitting diodes LD1 and LD3 are lighted on with power supply from the constant voltage circuit CC11. On the other hand, the output of the AND gate G4 changes to high level at which the output of the exclusive OR gate G5 changes to low level, thereby the shutter control circuit CC12 is rendered operative.

Next, when the battery voltage lowered from the level, the output of the comparator CP6 changes to high level at which the light-emitting diode LD4 is lighted on due to the conduction of the transistor Tr10, while the transistor Tr14 is rendered conductive which in turn causes non-conduction of the transistor Tr13, thus the power supply to the circuits CC1, CC2 and CC3 is cut off. Under this condition, the output of the OR gate G3 is maintained at high level. Therefore, so long as the output of the gate G4 remains of low level, the output of the exclusive OR gate G5 is maintained at high level. As a result, even in this case, the shutter control circuit CC12 is prevented from being operative until the lens L is set in the pan-focus position by use of the pan-focus detecting circuit CC4.

It is to be understood that the fifth embodiment of the invention permits the shutter control circuit to be operative only when the photo-taking lens L is properly adjusted to the in focus position by the use of the focus detection circuit CC2 or adjusted to the pan-focus position by the use of the pan-focus detecting circuit CC4. Further, the distance measuring circuit CC1, focus detecting circuit CC2 and focus indication circuit CC3 are automatically cut off from the electrical power source when the voltage of the source falls below the satisfactory operating level for these circuits.

Figure 8:
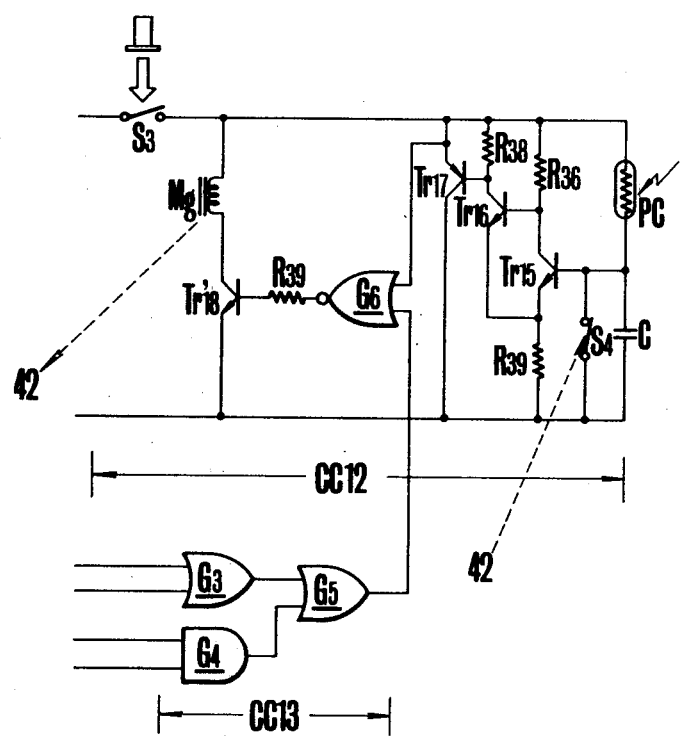
FIG. 8 is a similar diagram showing an example of modification of the fifth embodiment.

FIG. 8 shows an example of modification of the circuit for controlling the operation of the shutter control circuit in accordance with the output of the logic gating circuit. The magnetic winding Mg is provided independently of the Schmitt trigger circuit together with a npn transistor Tr'18, and there is provided a NOR gate G6 between the transistor Tr'18 and the Schmitt trigger circuit, so that only when the two inputs of the NOR gate G6 are of low level simultaneously, it produces an output of high level at which the transistor Tr'18 is rendered conductive.

Figure 9:
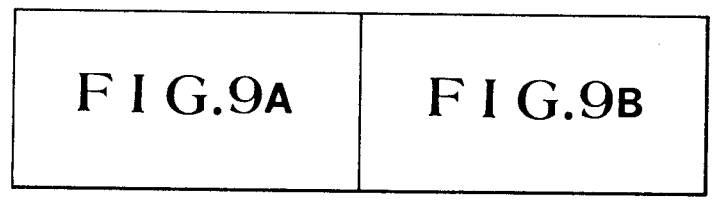
FIGS. 9, 9A and 9B are a similar diagram showing a sixth embodiment of the invention.
Figure 9A:
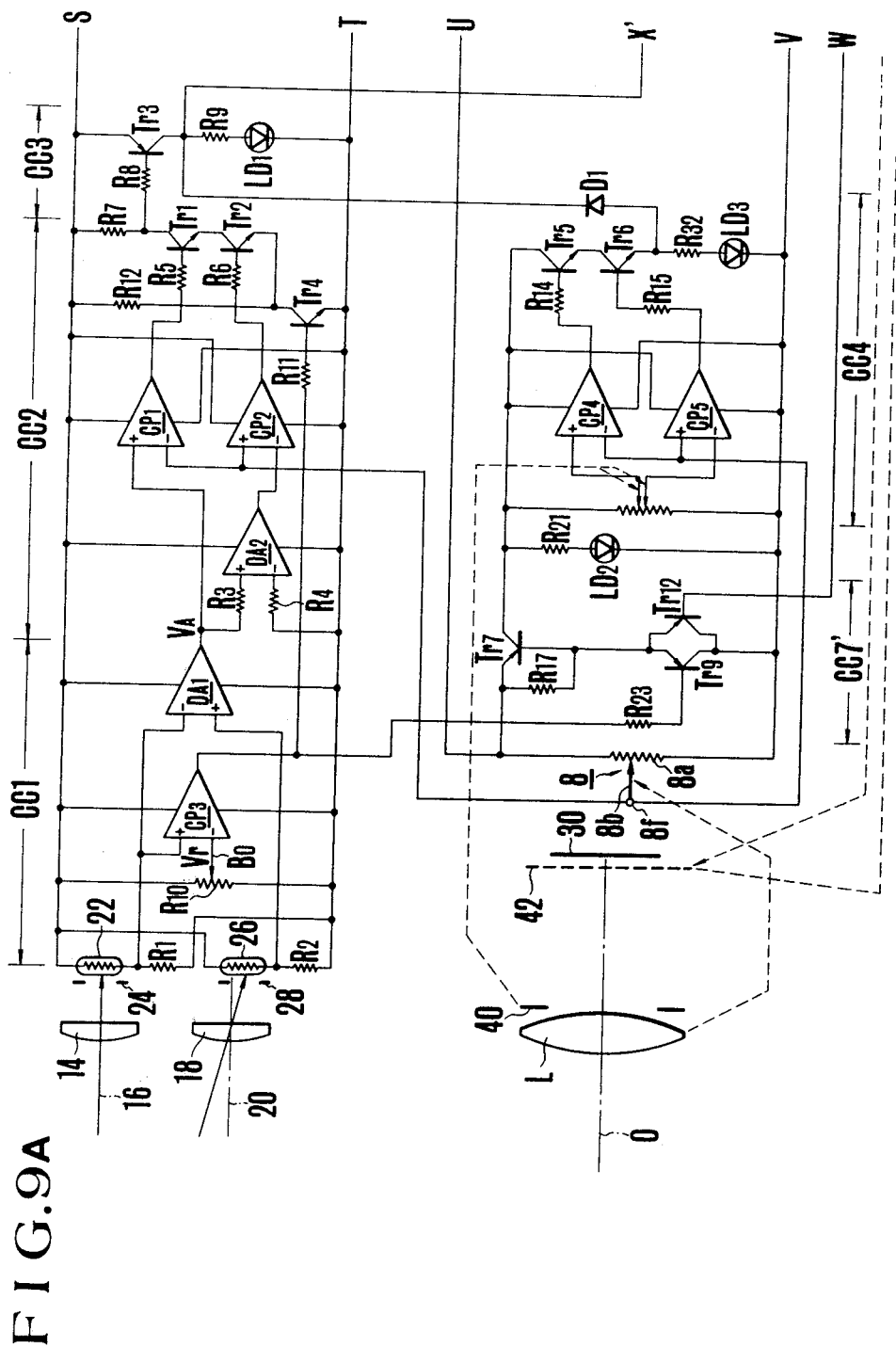
Figure 9B:
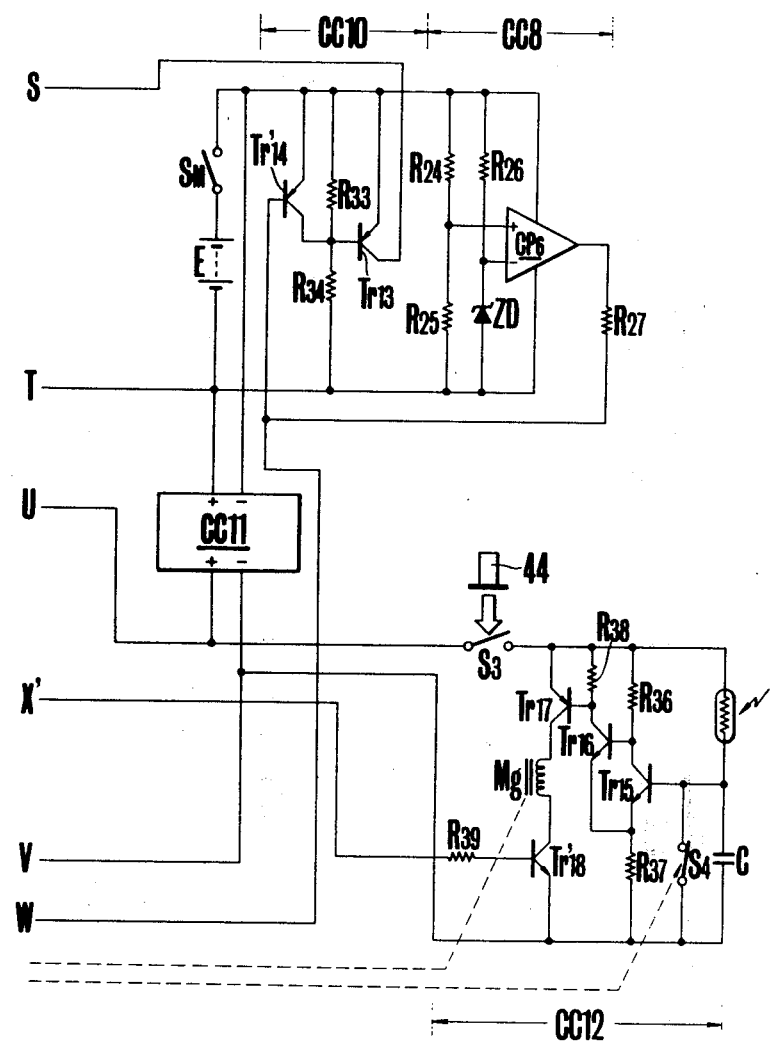

In FIG. 9, there is shown a sixth embodiment of the invention with FIG. 9A being the left-hand portion of a schematic circuit diagram of the camera focusing control device and with FIG. 9B being the right-hand portion of the circuit and a shutter control circuit. This embodiment is based on the fourth embodiment of FIG. 6 and improved in a manner similar to that shown in connection with the fifth embodiment of FIG. 7. For this reason, the parts of this embodiment which are different from those of FIGS. 6 and 7 will be explained below.

At first, the power supply control circuit CC10 makes use of a pnp transistor Tr114 instead of the npn transistor Tr14 of FIG. 7 because the output of the comparator CP6 changes from high to low level when the battery voltage drops below the level.

The shutter control circuit CC12 makes use of a npn transistor Tr'18 shown in FIG. 8 instead of the pnp transistor Tr18 of FIG. 7, and the logic gating circuit CC13 of FIG. 7 is omitted. The base of the transistor Tr'18 is connected through the resistor R39 to the conjunction of the transistor Tr3 and the resistor R9 in the focus indication circuit CC3. The other portion of the circuit of FIG. 9 is similar in construction to that shown in FIG. 7.

In controlling the operation of the shutter control circuit CC12, it is essential that only when the light-emitting diode LD1 is energized, the transistor Tr'18 is rendered conductive to cause the magnetic winding Mg to be controlled by the Schmitt trigger circuit, regardless of whether the focusing operation is performed in a normal or pan-focus manner. It is, of course, that when the battery voltage drop occurs, power supply to the distance measuring circuit CC1, focus detecting circuit CC2 and focus indication circuit CC3 from the battery E are cut off in a similar manner to that shown in connection with FIG. 7.

In any of the above described embodiments, the focusing ring 6 is operated by the photographer's hand. In final, by reference to FIG. 10, an example of a motor driven focusing control will be explained below. For this purpose, the use of the construction of FIG. 6 or FIG. 9 is particularly advantageous among the above-described embodiments. Therefore, the following description may be considered to disclose an example of improvement of the embodiment shown in FIG. 6 or FIG. 9.

Figure 10:
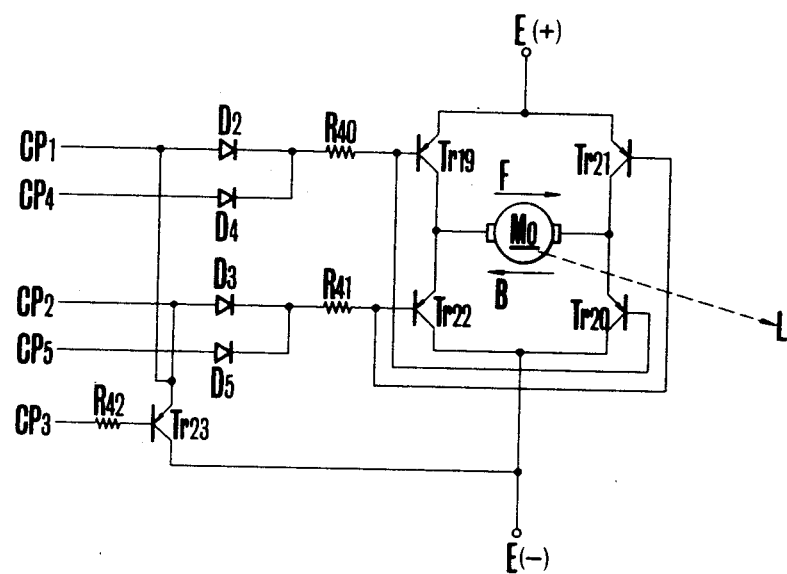
FIG. 10 is a similar diagram showing a part of a seventh embodiment of the invention which is different from the above mentioned embodiments.

In FIG. 10, Mo is a reversible motor having an output shaft not shown operatively connected to the focusing ring as schematically shown by dashed line. A control circuit for the motor Mo comprises two pairs of transistors Tr19 to Tr22. The emitters of the transistors Tr19 and Tr21 are connected to the positive terminal of the battery E, and the collectors of the transistors Tr20 and Tr22 are connected to the negative terminal of the battery E. The winding of the motor Mo is connected between the collector-emitter conjunction of the transistors Tr19 and Tr21 and that of the transistors Tr20 and Tr22, so that when a current flows in a direction indicated by an arrow F, the motor Mo rotates in a forward direction. Conversely, when a current flows in a direction indicated by an arrow B, the motor Mo rotates in a reverse direction. The bases of the transistors Tr19 and Tr20 are connected through a common protection resistor R40 to reverse current preventing diodes D2 and D4 and therefrom connected to the first comparator CP1 in the automatic focus detecting circuit CC2 and the first comparator CP4 in the pan-focus detecting circuit CC4 at thier outputs respectively. The bases of the transistors Tr21 and Tr22 are connected through a common protection resistor R41 to reverse current preventing diodes D3 and D5 and therefrom connected to the second comparator CP2 in the focus detecting circuit CC2 and the second comparator CP5 in the pan-focus detecting circuit CC4 at their outputs respectively. Tr23 is an output cutting transistor with a collector connected to the negative terminal of the battery E, with an emitter connected to the conjunction of the diode D2 and the comparator CP1 and also to the conjunction of the diode D3 and the comparator CP2, and with a base connected through a resistor to the output of the comparator CP3. In this construction, when the object brightness drop occurs to cause change of the ouput of the comparator CP3 to low level, the transistor Tr23 is rendered conductive thereby the outputs of the comparators CP1 and CP2 are forcibly made low.

The operation of the motor control circuit is as follows: With the pan-focus detecting circuit CC4 rendered inoperative, when the output of the comparator CP1 changes to low level, the transistors Tr19 and Tr20 are rendered conductive to cause a current to flow through the motor winding in F direction so that the motor Mo rotates in the forward direction. When the output of the comparator CP2 changes to low level, the transistors Tr21 and Tr22 are rendered conductive to cause a current to flow through the motor winding in B direction so that the motor Mo rotates in the reversed direction. When the outputs of the comparators CP1 and CP2 are of high level simultaneously, all the transistors Tr19 to Tr22 are rendered non-conductive to cause the motor Mo to be cut off from the battery E, thereby the motor Mo gets stopped. On the other hand, with the pan-focus detecting circuit CC4 rendered operative (in this case the outputs of the comparators CP1 and CP2 are cut off due to the conduction of the transistor Tr23 or the cutting off of the power supply to the circuits CC1, CC2 and CC3.), when the output of the comparator CP4 changes to low level, the transistors Tr19 and Tr20 are rendered conductive so that the motor Mo rotates in the forward direction. When the output of the comparator CP5 changes to low level, the transistors Tr21 and Tr22 are rendered conductive so that the motor Mo rotates in the reversed direction. When the outputs of the comparators CP4 and CP5 change to low level simultaneously, all the transistors Tr19 to Tr22 are rendered non-conductive, thereby the motor Mo is stopped. In this case, as mentioned before, the low level output of the comparator CP1 means that the lens L is deviated from proper focus position toward shorter distance position, and the low level output of the comparator CP2 means that the lens L is deviated from proper focus position toward longer distance position. On the other hand, the low level output of the comparator CP4 means that the lens L is deviated from pan-focus position toward shorter distance position, and the low level output of the comparator CP5 means that the lens L is deviated from pan-focus position toward longer distance position. Accordingly, if the motor Mo is operatively connected to the focusing ring 6 in such a manner that when the motor Mo rotates in the forward direction, the lens L is moved toward infinite focusing position, and when in the reversed direction the lens L is driven for movement toward close-up focusing position, the fully automatic adjustment of the lens L is properly performed.

As has been described above, according to improvements of the present invention, even when the satisfactory operation of the automatic focus detecting device or automatic focus adjusting device is not fully assured due to the object brightness level drop or battery voltage drop, it is made possible to effect approximate adjustment of focus on an object to be photographed and therefore to make photography under such a focusing condition for the object as to be permissible focusing condition. Therefore, in the camera provided with an automatic focus detecting device or automatic focus adjusting device, the relief provision according to the present invention is very advantageous in saving an unacceptable failure of focusing resulting from the unsatisfactory operation of these devices, and is proven to assure an improved performance of this type camera.

According to further improvements of the present invention, the exposure control system in the camera can operate only when the camera objective lens is in sharpest focus or in pan-focus, thereby the percentage of photographs taken with an unacceptable focusing condition is greatly decreased. The camera embodying the present invention is far more fool proof in this sense than was previously possible. In the illustrated embodiments of the invention, such fool proof means is constructed in the electrical form, but may be mechanical, for example, the shutter release button is locked in response to detection of improper focus. Many other variations are possible within the scope and spirit of the present invention.

As understood from the description of the embodiments of the present invention, the approximate focus position to which the camera objective lens is adjusted may coincide with the exact in-focus position when the supplementary device according to the present invention is used.

What is claimed is:

1. A device comprising:
   (A) lens means adjustable along an optical axis for focusing on an object;
   (B) distance detecting means for detecting the distance of the object and producing an electrical indication indicative of the object distance;
   (C) first indicating means correlated with said lens means for producing an electrical indication indicative of the position of the lens means on the optical axis;

(D) second indicating means for providing an electrical indication indicative of at least one limited distance;

(E) selecting means for automatically selecting one of the electrical indications produced by said distance detecting means and the electrical indication provided by said second indicating means; and (F) output indicating means response to the electrical indication selected by said selecting means and to the electrical indication produced by said first indicating means for producing an output indication which is available for setting the lens means to a position at which the lens means is focused to the distance indicated by the electrical indication selected by the selecting means.

2. A device according to claim 1, further comprising:

brightness detecting means for detecting the brightness of the object and producing a first characteristic output when the object brightness is above a predetermined brightness level and producing a second characteristic output when the object brightness is below a predetermined brightness level;

said selecting means being responsive to said brightness detecting means for selecting the electrical indication produced by said distance detecting means in response to the first characteristic output, and selecting the electrical indication provided by said second indicating means in response to the second characteristic output.

3. A device according to claims 1 or 2, wherein said second detecting means is arranged to provide the electrical indication as an electrical indication which indicates a hyper-focal distance for approximate focus of the lens means to the object.

4. An automatic focusing camera comprising:

an automatic focusing system for performing one of two different focus control functions, the first of which focuses an objective on an object more accurately than the second, and the second of which approximately focuses the objective on the object as an alternative to the first; and an exposure system including:

exposure means for exposing a film to object light coming through the objective; and exposure control means associated with said automatic focusing system for controlling the exposure operation of said exposure means and for prohibiting the exposure operation of the exposure means until at least one of said first and second focus control functions is performed by the automatic focusing system.

5. An automatic focusing camera according to claim 4, further comprising:

brightness detecting means for detecting the brightness of the object and controlling said automatic focusing system according to the detected object brightness and for causing the focusing system to perform the first focus control function when the object brightness is above a predetermined brightness level and causing the focusing system to perform the second focus control function when the object brightness is below a predetermined level.

6. An automatic focusing camera according to claims 4 or 5, further comprising:

power source circuit means for connection to a power source; and voltage detecting means for detecting the voltage level of the power provided by said power source circuit means and for causing the focusing system to perform the first focus control function when the voltage level of the power is above a predetermined level and causing the focusing system to perform the second focus control function when the object brightness is below a predetermined level.

* * * * *